(12) United States Patent
Komatsu

(10) Patent No.: US 6,242,374 B1
(45) Date of Patent: Jun. 5, 2001

(54) HIGH THERMAL CONDUCTIVE SILICON NITRIDE SINTERED BODY AND METHOD OF PRODUCING THE SAME

(75) Inventor: Michiyasu Komatsu, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/309,345

(22) Filed: May 11, 1999

(30) Foreign Application Priority Data

May 12, 1998 (JP) .................................................. 10-129154
Apr. 23, 1999 (JP) .................................................. 11-116899

(51) Int. Cl.$^7$ .................................................. C04B 35/587
(52) U.S. Cl. ........................ 501/97.2; 501/97.3; 264/683
(58) Field of Search .................................. 501/97.3, 97.2; 264/683

(56) References Cited

U.S. PATENT DOCUMENTS

| | | | | |
|---|---|---|---|---|
| 4,699,890 | * | 10/1987 | Matsui | 501/98 |
| 5,015,608 | * | 5/1991 | Matsihisa et al. | 501/97 |
| 5,017,531 | * | 5/1991 | Ukai et al. | 501/98 |
| 5,045,513 | * | 9/1991 | Mizuno et al. | 501/98 |
| 5,049,531 | * | 9/1991 | Nakanishi et al. | 501/98 |
| 5,217,931 | * | 6/1993 | Takami et al. | 501/88 |
| 5,238,884 | * | 8/1993 | Sakai et al. | 501/97 |
| 5,362,691 | * | 11/1994 | Worring et al. | 501/97 |
| 5,439,856 | * | 8/1995 | Komatsu | 501/97 |
| 5,629,250 | * | 5/1997 | Kawasaki et al. | 501/97 |
| 5,698,896 | * | 12/1997 | Komatsu et al. | 257/705 |
| 5,908,797 | * | 6/1999 | Urashima et al. | 501/97.3 |
| 5,922,629 | * | 7/1999 | Park et al. | 501/97.2 |

FOREIGN PATENT DOCUMENTS

| | | |
|---|---|---|
| 6-135771 | 5/1994 | (JP) . |
| 7-187793 | 7/1995 | (JP) . |
| 8-319187 | 12/1996 | (JP) . |
| 9-30866 | 2/1997 | (JP) . |
| 9-97862 | 4/1997 | (JP) . |
| 9-157030 | 6/1997 | (JP) . |
| 9-157054 | 6/1997 | (JP) . |
| 9-183666 | 7/1997 | (JP) . |

* cited by examiner

*Primary Examiner*—Karl Group
(74) *Attorney, Agent, or Firm*—Oblon, Spivak, McClelland, Maier & Neustadt, P.C.

(57) ABSTRACT

A high thermal conductive silicon nitride sintered body of this invention is characterized by containing: 2.0 to 17.5% by weight of a rare earth element in terms of the amount of an oxide thereof; 0.3 to 3.0% by weight of Mg in terms of the amount of an oxide thereof; if necessary, at most 1.5% by weight of at least one of calcium (Ca) and strontium (Sr) in terms of an oxide thereof, if necessary at most 1.5% by weight of at least one element selected from the group consisting of Ti, Zr, V, Nb, Ta, Cr, Mo and W in terms of the amount of an oxide thereof, and at most 0.3% by weight of Al, Li, Na, K, Fe, Ba, Mn and B as impurity cationic elements in terms of total amount thereof, comprising a silicon nitride crystal and a grain boundary phase. The sintered body has a ratio of a crystal compound phase formed in the grain boundary phase to the entire grain boundary phase of at least 20%, a porosity of at most 2.5% by volume, a thermal conductivity of at least 70 W/m·K, and a three-point bending strength of at least 700 MPa at a room temperature. In addition, the sintered body has a small surface roughness even if the sintered body is not subjected to a grinding work, and exhibits an excellent strength characteristics.

17 Claims, No Drawings

HIGH THERMAL CONDUCTIVE SILICON NITRIDE SINTERED BODY AND METHOD OF PRODUCING THE SAME

BACKGROUND OF THE INVENTION

1. Field of the Invention

The present invention relates to a high thermal conductive silicon nitride sintered body and a method of producing the same, more particularly, to a high thermal conductive silicon nitride sintered body which achieves high strength characteristics, high thermal conductivity, and good heat-radiating characteristics, and has an excellent surface characteristics even if the sintered body is not ground or polished, and is preferably used as various semiconductor substrate or a heat-radiating plate, and a method of producing the high thermal conductive silicon nitride sintered body.

2. Description of the Related Art

Ceramic sintered bodies containing silicon nitride as a main component have strong heat resistance. They resist temperatures as high as 1,000° C. or higher. Silicon nitride ceramic sintered bodies also have strong thermal shock resistance due to their low thermal expansivity. Because of these characteristics, silicon nitride ceramic sintered bodies are expected to be widely used as high-temperature structural materials, most of which are currently made of heat-resistant super alloys. In fact, silicon nitride ceramic sintered bodies are already used for high-strength heat-resistant components and parts of, for example, gas turbines, engines or steel making machines. Further, because of their high corrosion resistance to metal, some silicon nitride ceramic sintered bodies are applied to melt-resistant material for molten metal. Still further, because of their high abrasion resistance, some silicon nitride ceramic sintered bodies are applied to or tested for cutting tools or sliding parts such as bearings.

Various sintering compositions for silicon nitride w ceramic sintered bodies are known: silicon nitride-yttrium oxide-aluminum oxide system; silicon nitride-yttrium oxide-aluminum oxide-aluminum nitride system; and silicon nitride-yttrium oxide-aluminum oxide-oxide of titanium, magnesium or zirconium system.

The oxides of rare earth elements, such as yttrium oxide ($Y_2O_3$) in the sintering compositions listed above, have been widely used as sintering assistant agents. Such rare earth element oxides enhance the sintering characteristics of sintering materials and, therefore, achieve high density and high strength of the sintered bodies.

According to the conventional art, silicon nitride sintered bodies are generally mass-produced as follows. After a sintering assistant agent as mentioned above is added to the powder of silicon nitride, the mixture is molded to form a compact. Then, the compact is sintered in a sintering furnace at about 1,600–1,900° C. for a predetermined period of time followed by cooling in the furnace.

However, though the silicon nitride sintered body produced by the conventional method achieves high mechanical strengths such as toughness, the thermal conductivities thereof are significantly lower than those of aluminum nitride (AlN) sintered bodies, beryllium oxide (BeO) sintered bodies or silicon carbide (SiC) sintered bodies. Therefore, conventional silicon nitride sintered bodies are unsuitable for electronic materials, such as semiconductor substrates, that need good heat-radiating characteristics. Accordingly, the use of silicon nitride sintered body is thus limited.

On the other hand, aluminum nitride sintered bodies have high thermal conductivity and low thermal expansivity, compared with other ceramic sintered bodies. Therefore, aluminum nitride sintered bodies are widely used as packaging materials or materials of circuit base boards for semiconductor chips, which have been progressively improved in operational speed, output power, variety of functions and size. However, no conventional aluminum nitride sintered bodies achieve sufficiently high mechanical strengths. Therefore, there is a growing need for a ceramic sintered body having both high thermal conductivity and high strength.

To cope with the growing need described above, the inventor of this invention had developed a silicon nitride sintered body which is excellent in both mechanical strength and thermal conductivity. However, in the conventional silicon nitride sintered body containing no magnesium oxide (MgO) there is caused a drawback that surface roughness of a surface of the sintered body after sintering operation (hereinafter referred to simply as "sintered surface") is disadvantageously increased and a size of pore (void) to be formed at a surface portion of the sintered body becomes large. Accordingly, in the conventional sintered body, it was necessary to post-work the sintered surface of the sintered body thereby to expose a worked surface having a desired strength, followed by producing a final product using the sintered body. As a result, there is posed problems that the manufacturing process of the sintered body will become complicated and production cost will be disadvantageously increased.

SUMMARY OF THE INVENTION

The present invention has been made to cope with the problems and demands mentioned above, and an object of the present invention is to provide improvement of a silicon nitride sintered body having a high thermal conductivity, good heat-radiating characteristics, and excellent surface characteristics even if the sintered body is not ground or polished, as well as the high strength characteristics generally inherent in silicon nitride sintered body, and a method of producing such the silicon nitride sintered body.

To achieve the above object, the present inventor studied the effects of the types of silicon nitride powder, sintering assistant agent and additives, the amounts thereof used, and the sintering conditions on the characteristics of the final products, that is, the sintered bodies, by performing experiments.

As the results, the experiments provided the following findings. That is, a silicon nitride sintered body having both high strength and high thermal conductivity can be obtained by: adding certain amounts of a rare earth element, and if necessary, at least one compound selected from the group consisting of oxides, carbides, nitrides, silicides and borides of Ti, Zr, V, Nb, Ta, Cr, Mo and W, to a highly-pure fine powder of silicon nitride to prepare a material mixture; molding the material mixture to form a compact and degreasing the compact: maintaining the compact at a predetermined high temperature for a certain period of time to sinter the compact so as to enhance the density thereof; and then moderately cooling the sintered body at a certain cooling rate.

Further, the following acknowledgement could be obtained. That is, formation of a glass phase (amorphous phase) in the grain boundary phase is effectively suppressed by using a highly pure powder of silicon nitride containing reduced amounts of oxygen and impurity cationic elements, and preparing a silicon nitride molded compact having a reduced thickness before sintering. Thereby, a silicon nitride sintered body having a high thermal conductivity of 70 W/m·K or higher, more preferably, 90 W/m·K or higher can be obtained even if only an oxide of rare earth element is added to a silicon nitride material powder.

If a sintered body in a sintering furnace is cooled by switching off a heating power source of the furnace as performed according to the conventional producing method, the cooling rate was rather high and rapid, that is, about 400–800° C. per hour. However, an experiment performed by the present inventor provided the following findings. That is, the grain boundary phase in the structure of a silicon nitride sintered body is changed from an amorphous phase to a phase including crystal phases by moderately cooling the sintered body at a rate of 100° C. per hour or lower while controlling the cooling rate, thereby achieving both high strength and high thermal conductivity.

The above-mentioned high thermal conductive silicon nitride sintered body itself is partially applied for a patent by the present inventor, and is disclosed in Japanese Unexamined Patent Publication No. 6-135771, Japanese Unexamined Patent Publication No. 7-48174 and Japanese Unexamined Patent Publication No. 9-69672.

However, the present inventor improved and studied the silicon nitride sintered body to provide the following findings. That is, when the silicon nitride sintered body contains 0.3 to 3.0% by weight of magnesium (Mg) in terms of the amount of an oxide thereof in addition to a rare earth element, the strength of the sintered body is further increased. At the time of sintering, transition temperature at which $\alpha$-$Si_3N_4$ material is changed to $\beta$-$Si_3N_4$ is lowered, and surface roughness of a sintered surface of the sintered body becomes small to be 0.4 $\mu$m Ra or less, preferably be 0.3 $\mu$m Ra or less. In addition, size of pores or voids to be formed to the surface of the sintered body is decreased, the strength at the sintered surface of the sintered body can be improved, and sintering properties are further improved. As a result, a first invention has been completed on the basis of the above findings.

In this connection, even in a case where the material compact is sintered at temperature range of 1700 to 1900° C., the resultant sintered body achieves a high bending strength of 750 MPa or more at the worked surface, a high bending strength of 700 MPa or more at the sintered surface, a surface roughness of 0.4 $\mu$m or less in terms of center line average roughness (Ra), and a high thermal conductivity of 70 W/m·K or higher.

Further, when the silicon nitride sintered body contains 0.3 to 3.0% by weight of magnesium (Mg) in terms of the amount of an oxide thereof in addition to a rare earth element and hafnium oxide ($HfO_2$), the strength of the sintered body is still further increased. At the time of sintering, transition temperature at which $\alpha$-$Si_3N_4$ material is changed to $\beta$-$Si_3N_4$ is lowered, and surface roughness of a sintered surface of the sintered body becomes small to be 0.4 $\mu$m Ra or less, preferably be 0.3 $\mu$m Ra or less. In addition, size of pores or voids to be formed to the surface of the sintered body is decreased, the strength at the sintered surface of the sintered body can be improved, and sintering properties are still further improved. As a result, a second invention has been completed on the basis of the above findings.

In this connection, even in a case where the material compact is sintered at temperature range of 1600 to 1900° C., the resultant sintered body achieves a high bending strength of 750 MPa or more at the worked surface, a high bending strength of 700 MPa or more at the sintered surface, a surface roughness of 0.4 $\mu$m or less in terms of center line average roughness (Ra), and a high thermal conductivity of 70 W/m·K or higher.

In this regard, a "sintered surface" of the sintered body will be explained hereunder. The "sintered surface" means a surface of the sintered body to which a grinding work or a polishing work is not subjected yet. In other words, the surface means a surface of the sintered body as it is, immediately after the sintering operation.

In general, a silicon nitride sintered body is manufactured by setting a silicon nitride compact on a sintering board (setter, suscepter, or boat), followed by sintering the compact under predetermined conditions. For example, in a case where the silicon nitride sintered body is used as a semiconductor substrate, the substrate is provided with a circuit layer consisting of metal plate on a surface (lower surface) of the substrate to which the sintering board is contacted, and on a surface (upper surface) opposing to the upper surface. At this time, when a surface roughness of the sintered body is large, bonding property between the circuit layer and the sintered body is disadvantageously deteriorated, so that it is necessarily required to improve a flatness of the surface of the sintered body.

In contrast, since the silicon nitride sintered body of this invention is remarkably improved in a sintering property, surface property of the sintered body as sintered is improved. Therefore, for example, when the sintered body is used as the semiconductor substrate, the circuit layer can be directly bonded to the surface of the sintered body as it is, without being subjected to the surface grinding work against the sintered body. As a result, for example, even if a sintering board having a surface roughness (Ra) of about 0.7 $\mu$m is used, the surface roughness (Ra) of the sintered body becomes 0.4 $\mu$m or less, so that it is not necessary to use a sintering board of which surface roughness is strictly controlled.

Accordingly, in the present invention, the "sintered surface" denotes an upper surface of the sintered body to which the sintering board is contacted, and denotes a surface opposing to the upper surface of the sintered body. For example, in the semiconductor substrate, the sintered surface denotes the surface to which the circuit layer is provided and an opposing surface thereof. In general, the silicon nitride sintered body is cut to form a substrate having a predetermined shape, so that side surfaces of the sintered body are greatly influenced on surface property thereof in accordance with the cutting method. Therefore, in the present invention, the side surfaces of the sintered body are not included to the "sintered surface".

In addition, when a plurality of silicon nitride sintered bodies are produced in one sintering furnace, there is a case where a plurality of $Si_3N_4$ compacts are piled so that separating powder such as BN (boron nitride) is interposed between the adjacent compacts for the purpose of preventing the adjacent compacts from being fixed to each other by fusion, and then the compacts are sintered. In this case, a honing process is necessarily required so as to remove the separating powder after completion of the sintering operation. Therefore, the grinding work used in the present invention denotes a grinding work using a diamond grinding stone or the like. However, the sintered body of this invention exhibits a surface roughness (Ra) of 0.4 $\mu$m or less even if the grinding work is not conducted to the sintered body.

Note, as described above, though the sintered body of this invention exhibits such an excellent surface property without being subjected to the grinding work, it goes without saying that a sintered body subjected to the grinding work may also be used.

The present invention has been accomplished on the basis of the above findings. Namely, the high thermal conductive silicon nitride sintered body according to the first invention is characterized by containing: 2.0 to 17.5% by weight of a rare earth element in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, comprising a silicon nitride crystal and a grain boundary phase, and having a ratio of a crystal compound phase formed in the grain boundary phase to the entire grain boundary phase of at least 20%.

Another aspect of the present invention provides a high thermal conductive silicon nitride sintered body characterized by containing: 2.0 to 17.5% by weight of a rare earth element in terms of the amount of an oxide thereof; and 0.3 to 3.0% by weight of Mg in terms of the amount of an oxide thereof; comprising a silicon nitride crystal and a grain boundary phase, and having a ratio of a crystal compound phase formed in the grain boundary phase to the entire grain boundary phase of at least 20%, and having a thermal conductivity of at least 70 W/m·K.

Further, the sintered body may be constituted so as to contain at most 1.5% by weight of at least one of calcium (Ca) and strontium (Sr) in terms of an oxide thereof. This feature means that either one of Ca and Sr may be contained at most 1.5% by weight in terms of an oxide thereof, or also means that each of Ca and Sr may be contained respectively at most 1.5% by weight in terms of an oxide thereof.

A high thermal conductive silicon nitride sintered body according to the first invention is produced in accordance with the following method. That is, the method characterized by comprising the steps of: forming a compact by molding a mixture obtained by adding 2.0 to 17.5% by weight of a rare earth element in terms of the amount of an oxide thereof, 0.3 to 3.0% by weight of Mg in terms of the amount of an oxide thereof, and if required, at most 1.5% by weight of at least one of calcium (Ca) and strontium (Sr) in terms of an oxide thereof, to a silicon nitride powder which contains at most 1.7% by weight of oxygen, at most 0.3% by weight of Al, Li, Na, K, Fe, Ba, Mn and B as impurity cationic elements in terms of total amount thereof, and at least 90% by weight of alpha-phase type silicon nitride, and which has an average grain size of at most 1.0 μm; degreasing the compact; sintering the compact at a temperature of 1,700–1,900° C. under an atmosphere of normal pressure or pressurized atmosphere thereby to form a sintered body; and moderately cooling the sintered body at a cooling rate of at most 100° C. per hour until the temperature is reduced to a point at which a liquid phase formed by the rare earth element and MgO during the sintering step solidifies.

In addition, the high thermal conductive silicon nitride sintered body according to the second invention is characterized by containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and having a thermal conductivity of at least 70 W/m·K.

Another aspect of the present invention provides a high thermal conductive silicon nitride sintered body characterized by containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and comprising a silicon nitride crystal and a grain boundary phase, and having a ratio of a crystal compound phase formed in the grain boundary phase to the entire grain boundary phase of at least 20%.

Still another aspect of the present invention provides a high thermal conductive silicon nitride sintered body characterized by containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and comprising a silicon nitride crystal and a grain boundary phase, and having a ratio of a crystal compound phase formed in the grain boundary phase to the entire grain boundary phase of at least 20%, and having a thermal conductivity of at least 70 W/m·K.

Further, the high thermal conductive silicon nitride sintered body may be constituted so as to contain at most 1.5% by weight of at least one of calcium (Ca) and strontium (Sr) in terms of an oxide thereof. In addition, the high thermal conductive silicon nitride sintered body may be constituted so as to contain at most 1.5% by weight of at least one element selected from the group consisting of Ti, Zr, V, Nb, Ta, Cr, Mo and W in terms of the amount of an oxide thereof.

A high thermal conductive silicon nitride sintered body according to the second invention is produced in accordance with the following method. That is, the method characterized by comprising the steps of: forming a compact by molding a mixture obtained by adding 2.0 to 17.5% by weight of a rare earth element in terms of the amount of an oxide thereof, 0.3 to 3.0% by weight of Hf in terms of the amount of an oxide thereof, 0.3 to 3.0% by weight of Mg in terms of the amount of an oxide thereof, to a silicon nitride powder which contains at most 1.7% by weight of oxygen, at most 0.3% by weight of Al, Li, Na, K, Fe, Ba, Mn and B as impurity cationic elements in terms of total amount thereof, and at least 90% by weight of alpha-phase type silicon nitride, and which has an average grain size of at most 1.0 μm; degreasing the compact; sintering the compact at a temperature of 1,600–1,900° C. thereby to form a sintered body; and moderately cooling the sintered body at a cooling rate of at most 100° C. per hour until the temperature is reduced to a point at which a liquid phase formed of the rare earth element during the sintering step solidifies.

In the above production method, at most 1.5% by weight of at least one of calcium (Ca) and strontium (Sr) in terms of oxide thereof is preferably added to the silicon nitride powder. Further, at most 1.5% by weight of at least one element selected from the group consisting of Ti, Zr, V, Nb, Ta, Cr, Mo and W in terms of the amount of an oxide thereof is preferably added to the silicon nitride powder.

According to the above described production method, a grain boundary phase containing a rare earth element and the like is formed in a silicon nitride crystal structure, and a silicon nitride sintered body excellent in both mechanical characteristics and thermal conductive characteristics, more specifically, a porosity of at most 2.5% by volume, a thermal conductivity of at least 70 W/m·K, and a three-point bending strength of at least 700 MPa at a room temperature can be obtained.

To achieve good sintering characteristics, high strength and high thermal conductivity of the product, the silicon nitride fine powder which is used in the method of the invention and contained as a main component in the sintered body of the invention contains at most 1.7%, preferably, 0.5–1.5%, by weight of oxygen, at most 0.3%, preferably, 0.2% or less, by weight of Li, Na, K, Fe, Mg, Ca, Sr, Ba, Mn and B as impurity cationic elements in terms of total amount thereof, and at least 90%, more preferably, at least 93%, by weight of alpha-phase type silicon nitride, and, further the powder has fine grains, that is, an average grain size of at most 1.0 µm, more preferably about 0.4–0.8 µm.

The use of a fine powder of silicon nitride having an average grain size of 1.0 µm or less facilitates forming a dense sintered body having a porosity of at most 2.5% by volume without requiring a large amount of a sintering assistant agent, and therefore reduces the potential adverse effect of a sintering assistant agent on the thermal conductivity of the sintered body.

The total amount of the impurity cationic elements contained in the sintered body, that is, Al, Li, Na, K, Fe, Ba, Mn and B, is limited to at most 0.3% by weight in order to ensure the thermal conductivity of at least 70 W/m·K, because the impurity cationic elements adversely affect the thermal conductivity of the sintered body. In particular, for the same reason described above, the total amount of the impurity cationic elements is more preferably set to be at most 0.2% by weight. In this case, since the silicon nitride powder used to obtain an ordinary silicon nitride sintered body contains a relatively large amounts of Fe and Al, a total amount of Fe and Al is used as a criteria for the total amount of impurity cationic elements.

The use of a silicon nitride powder containing at least 90% by weight of alpha-phase type silicon nitride, which has better sintering characteristics than a beta-phase type, facilitates producing a high-density sintered body.

Examples of the rare earth element to be added as a sintering assistant agent to a silicon nitride powder are Y, Ho, Er, Yb, La, Sc, Pr, Ce, Nd, Dy, Sm and Gd. Such a rare earth element may be added to the silicon nitride powder in the form of an oxide thereof or a substance which is changed into an oxide thereof during the sintering process. Two or more kinds of such oxide or substance may be added to the silicon nitride powder. Such a sintering assistant agent reacts with the silicon nitride powder so as to form a liquid phase and thereby serves as a sintering promoter.

The amount of a sintering assistant agent to be contained in the material powder is set to be within a range of from 2.0% to 17.5% or less by weight in terms of the amount of an oxide thereof. If the amount is less than 2.0% by weight, the sintered body fails to achieve a sufficiently high density and high thermal conductivity. In particular, when an element which has a large atomic weight like lanthanoid is used as the rare earth element, a sintered body having relatively low strength and relatively low thermal conductivity is formed.

On the other hand, if the amount is more than 17.5% by weight, an excessively large portion of the grain boundary phase is formed, thereby reducing the thermal conductivity and strength of the sintered body. For this reason, the amount of a sintering assistant agent is within the range described above. For the same reason described above, the more preferred range of the amount of a sintering assistant agent is 3 to 15% by weight.

An oxide (MgO) of magnesium (Mg) to be used as addition component in the present invention promotes a function of the above rare earth element as sintering promoter thereby to enable the sintered body to be densified at a low temperature range. In addition, magnesium oxide (MgO) has a function of controlling a grain growth in the crystal structure of the sintered body thereby to increase the mechanical strength of $Si_3N_4$ sintered body. Further, the magnesium oxide provides an effect of lowering a transition temperature at which $\alpha$-$Si_3N_4$ material is changed to $\beta$-$Si_3N_4$, during sintering operation thereby to decrease a surface roughness of the sintered body surface, and provides an effect of decreasing the size of the pore or void to be formed on surface portion of the sintered body thereby to increase the strength at the sintered surface of the sintered body.

If the addition amount of Mg is less than 0.3% by weight in terms of an oxide thereof, the sintered body fails to achieve a sufficiently addition effect. If the amount is greater than 3.0% by weight, the thermal conductivity of the sintered body is reduced. For this reason, the preferred range of the amount of magnesium oxide is set to 0.3–3.0% by weight, preferably, 0.5–2% by weight.

Hf to be used as an addition component in the second invention is added as oxides, carbides, nitrides, silicides and borides. These compounds promote a function of rare earth element as sintering promoter, and promote a function of promoting the crystallization of the grain boundary phase, thereby to improve thermal conductivity and mechanical strength of the $Si_3N_4$ sintered body.

If the amount of Hf contained is less than 0.3% by weight in terms of an oxide thereof, the sintered body fails to achieve a sufficiently addition effect. In contrast, if the amount exceeds 3.0% by weight, the thermal conductivity, mechanical strength and electrical breakdown strength of the sintered body are reduced. For this reason, the preferred range of the amount of hafnium oxide contained is set to 0.3–3.0% by weight.

Further, in the present invention, oxides of Ca and Sr (CaO, SrO) promote a function of rare earth element as sintering promoter. In particular, these compounds provide a remarkable effect when the sintering is conducted under atmosphere of a normal pressure.

If total addition amount of CaO and SrO contained is less than 0.1% by weight, a sintering operation at a higher temperature is disadvantageously required. In contrast, if the amount exceeds 1.5% by weight, an excessive amount of grain boundary phase is generated thereby to lower the thermal conductivity. For this reason, the range of the amount of calcium oxide and strontium oxide to be contained is set to 1.5% or less by weight, preferably to 0.1–1.0% by weight. In particular, in order to secure good performance in both strength and thermal conductivity, the addition amount is preferably set to a range of 0.1–0.75% by weight.

Ti, Zr, V, Nb, Ta, Cr, Mo and W to be used as another addition component in the second invention are added to the sintered body as oxides, carbides, nitrides, silicides and borides thereof. These compounds promote the sintering assistant effect of a rear earth element, and promotes dispersion thereof in the crystal structure so as to enhance the mechanical strength of the silicon nitride ($Si_3N_4$) sintered body. Among them, compounds of Ti and Mo are particularly preferred.

If the amount of these compounds contained is less than 0.1% by weight, the sintered body fails to achieve a sufficiently addition effect. If the amount is greater than 3.0% by weight, the thermal conductivity, mechanical strength and electrical breakdown strength of the sintered body are reduced. For this reason, the preferred range of the amount of these compounds contained is 0.1–1.5% by weight. In particular, the amount is more preferably set to a range of 0.2–1.0% by weight.

The above compounds, such as Ti and Mo, also serve as light blocking agents (light shielding agents). More specifically, they color the silicon nitride sintered body black and thus provides it with an opacity. For this reason, a circuit board on which an integrated circuit or the like which tends to malfunction when exposed to light is packaged is to be manufactured, the compounds of Ti and the like are preferably added to the silicon nitride powder so as to form a silicon nitride substrate having excellent light blocking characteristics.

Since the porosity of a sintered body significantly affects the thermal conductivity and strength of the sintered body, the porosity is preferably set to 2.5 vol % or less. If the porosity is greater than 2.5% by volume, the sintered body fails to achieve high thermal conductivity, and the thermal conductivity and strength of the sintered body are reduced to undesired levels.

Although a silicon nitride sintered body is structurally constituted by a silicon nitride crystal phase and a grain boundary phase, the ratio of the crystal compound phase to the grain boundary phase significantly affects the thermal conductivity of the sintered body. In the high thermal conductive silicon nitride sintered body of the present invention, the ratio of the crystal compound phase to the grain boundary phase is required to be set to 20% or higher, more preferably, 50% or higher. If the ratio is less than 20%, the sintered body fails to achieve a thermal conductivity of at least 70 W/m·K and, therefore, a sintered body having good heat-radiating characteristics and a desirable high-temperature strength cannot be obtained.

To ensure that the porosity of the silicon nitride sintered body is limited to at most 2.5% by volume and the ratio of a crystal phase formed in the grain boundary phase to the entire grain boundary phase becomes at least 20%, it is important that a silicon nitride molded compact must be sintered by normal-pressure-sintering method or pressured-sintering method at temperature of 1,700–1,900° C. (1,600–1,900° C. in case of the second invention) for about 2–10 hours immediately followed by cooling the sintered body at a rate of 100° C. per hour or slower.

If the sintering temperature is lower than 1,700° C. (lower than 1,600° C. in case of the second invention), the sintered body fails to achieve a sufficiently high density; more specifically, the porosity becomes greater than 2.5 vol %, thereby reducing both the mechanical strength and thermal conductivity of the sintered body to undesired levels. On the other hand, if the sintering temperature is higher than 1,900° C., the silicon nitride component per se becomes likely to evaporate or decompose. In particular, if pressured-sintering process is not performed but the sintering process is performed under the normal pressure, the decomposition and evaporation of the silicon nitride component may occur at about 1,800° C.

The rate of cooling a sintered body immediately upon completion of the sintering operation is an important control factor to achieve crystallization of the grain boundary phase. If the sintered body is rapidly cooled at a cooling rate higher than 100° C. per hour, the grain boundary phase of the sintered body structure becomes an amorphous phase (glass phase) and, therefore, the ratio of a crystal phase formed of the liquid phase to the entire grain boundary phase becomes less than 20%. Thereby, the strength and thermal conductivity of the sintered body are reduced to undesired levels.

The sufficiently broad temperature range in which the cooling rate must be precisely controlled is from a predetermined sintering temperature (1,700–1,900° C. in case of the first invention and 1,600–1,900° C. in case of the second invention) to the solidifying point of the liquid phase formed by the reaction of the sintering assistant agent as described above. The liquid phase solidifies at about 1,600–1,500° C. if the sintering assistant agent as described above is used. By maintaining the cooling rate at 100° C. per hour or slower, preferably, 50° C. per hour or slower, more preferably, 25° C. per hour or slower, at least in a temperature range from the above sintering temperature to the solidifying point of the liquid phase, 20% or more, preferably, 50% or more, of the grain boundary becomes a crystal phase, thus achieving a sintering body having both high mechanical strength and high thermal conductivity.

A silicon nitride sintered body according to the present invention can be produced by, for example, the following processes. A material mixture is prepared by adding predetermined amount of a sintering assistant agent, a required additive, such as an organic binder, and CaO, SrO, and/or a compound of Ti, to a fine powder of silicon nitride which has a predetermined fine average grain size and contains very small amount of impurities. The material mixture is then molded into a compact having a predetermined shape. As a method of molding the material mixture, a conventional sheet molding method, such as the die-press method or the doctor-blade method can be applied.

After the molding process, the molding compact is maintained at 600–800° C. for 1–2 hours in a non-oxidizing atmosphere or at 400–500° C. for 1–2 hours in the air, thereby degreasing the compact, that is, thoroughly removing the organic binder added in the material mixture preparing process. The degreased compact is then sintered by normal-pressure-sintering method or pressured-sintering method at a temperature of 1,700–1,900° C. (1,600–1,900° C. in case of the second invention) in an atmosphere of an inert gas, such as nitrogen gas or argon gas.

The silicon nitride sintered body produced by the above method achieves a porosity of 2.5% or less, a thermal conductivity of 70 W/m·K (at 25° C.) or greater, preferably, 80 W/m·K or greater, and good mechanical characteristics, that is, a three-point bending strength of 700 MPa or greater.

A silicon nitride sintered body which is formed by adding SiC or the like having high thermal conductivity to silicon nitride having low thermal conductivity to have a thermal conductivity of 70 W/m·K or greater is not included in the claims. However, a silicon nitride based sintered body which is formed by combining SiC or the like having high thermal conductivity to a silicon nitride sintered body having a thermal conductivity of 70 W/m·K or greater is included in the claims of the present invention as a matter of course.

DESCRIPTION OF THE PREFERRED EMBODIMENTS

The embodiments of the present invention will be described below with reference to Examples described below.

EXAMPLES 1–3

5% by weight of $Y_2O_3$ (yttrium oxide) powder as a sintering assistant agent having an average grain size of 0.7 μm and 1.5% by weight of MgO (magnesium oxide) powder as another sintering assistant agent having an average grain size of 0.5 μm were added to a silicon nitride material powder containing 1.3% by weight of oxygen, 0.10% by weight of Al, Li, Na, K, Fe, Ba, Mn and B as impurity cationic elements in terms of total amount thereof and 97% by weight of alpha-phase type silicon nitride, and having an average grain size of 0.40 μm. The above-described mixture was wet-blended in ethyl alcohol for 72 hours and then dried to obtain a material mixture powder.

A predetermined amount of an organic binder was added to the material mixture powder, and then homogeneously mixed. The mixture was then press-molded under a molding pressure of 1,000 kg/cm² to obtain a plurality of molded compacts each having a size of 50 mm (length)×50 mm (width)×5 mm (thickness). After the compacts were degreased in air-flowing atmosphere at 500° C. for 2 hours, the degreased compacts were sintered to enhance the density thereof, in the following manner. The degreased compacts were maintained at 1,800° C. for 8 hours in a nitrogen gas atmosphere at 7.5 atm to form sintered bodies. While the sintered bodies were moderately cooled, the cooling rates were determined at 100° C./hr (Example 1), 50° C./hr (Example 2) and 25° C./hr (Example 3) by controlling the power supplied to the heating devices provided in sintering furnaces until the temperature inside the furnaces reached 1,500° C. Silicon nitride ceramic sintered bodies of the three-point bending strengths were measured under the following two cases: a case where the sintered surface of the sintered body is set, as it is, to a tension side surface for the three-point bending strength test; and a case where the sintered surface is ground by means of a diamond grindstone so as to form a grinding-worked surface having a surface roughness of about 0.8S (0.15 $\mu$m Ra), thereafter, the grinding-worked surface of the sintered body is set to the tension side surface for the three-point bending strength test. Further, X-ray analysis of each sintered body was performed to determine the ratio (area ratio) of the crystal phase to the grain boundary phase.

The results shown in Table 1 were obtained.

TABLE 1

| Sample | Cooling Rate until 1500° C. after sintering (° C./hr) | Porosity (%) | Crystal Phase Ratio to Grain Boundary Phase (Area Ratio) (%) | Surface Roughness of Sintered Surface Ra ($\mu$m) | Thermal Conductivity (W/m. K) | Three-Point Bending Strength (MPa) | |
|---|---|---|---|---|---|---|---|
| | | | | | | Worked Surface | Sintered Surface |
| Example 1 | 100 | 0.5 | 21 | 0.25 | 76 | 1160 | 1020 |
| Example 2 | 50 | 0.4 | 30 | 0.25 | 80 | 1100 | 950 |
| Example 3 | 25 | 0.2 | 45 | 0.30 | 86 | 1000 | 850 |
| Comparative Example 1 | 500 | 0.6 | 8 | 0.35 | 65 | 1050 | 870 |
| Comparative Example 2 | 100 | 0.6 | 3 | 0.30 | 40 | 980 | 800 |
| Comparative Example 3 | 100 | 4.5 | 0 | 0.35 | 28 | 720 | 600 |

Examples 1–3 were thus prepared. In this case, as the sintering board used in the sintering operation, a sintering board having a surface roughness (Ra) of 0.7 $\mu$m was used.

COMPARATIVE EXAMPLE 1

A silicon nitride sintered body of Comparative Example 1 was prepared under generally the same conditions as in Example 1, except that immediately after the sintering process is completed to enhance the density of the sintered body, the heating device was powered off to cool the sintered body at a cooling rate (about 50° C./hr) as performed by the conventional furnace cooling method.

COMPARATIVE EXAMPLE 2

A silicon nitride sintered body of Comparative Example 2 was prepared under generally the same conditions as in Example 1, except for using a silicon nitride material powder having an average grain size of 0.60 $\mu$m and containing 1.5% by weight of oxygen, 0.6% by weight of the impurity cationic elements in terms of total amount thereof and 93% by weight of alpha-phase type silicon nitride.

COMPARATIVE EXAMPLE 3

A silicon nitride sintered body of Comparative Example 3 was prepared under generally the same conditions as in Example 1, except for using a silicon nitride material powder having an average grain size of 1.2 $\mu$m and containing 1.7% by weight of oxygen, 0.7% by weight of the impurity cationic elements in terms of total amount thereof and 91% by weight of alpha-phase type silicon nitride.

The silicon nitride sintered bodies of Examples 1–3 and Comparative Examples 1–3 were examined to determine their porosities, thermal conductivities (at 25° C.), and three-point bending strengths at a room temperature. Note, As is apparent from the results shown in Table 1, the silicon nitride ceramic sintered bodies of Examples 1–3, which were cooled at rates lower than the cooling rate in Comparative Example 1 immediately after the density-enhancing sintering process, had crystal phases formed in the grain boundary phases. A silicon nitride sintered body having a higher ratio of the crystal phase to the grain boundary phase was used to obtain a high-strength sintered body having a higher thermal conductivity and better heat-radiation characteristics.

On the other hand, when the cooling rate of a sintered body was set to be high to rapidly cool the sintered body as in Comparative Example 1, a ratio of crystal phase in the grain boundary phase was small to be 10% or less, and the thermal conductivity was reduced to an undesired level. On the other hand, when a silicon nitride material powder containing a large amount of impurity cationic elements, that is, 0.6% by weight, was used as in Comparative Example 2, almost grain boundary phase was amorphous although the cooling rate was the same as in Example 1, thereby reducing the thermal conductivity.

When a coarse silicon nitride powder having an average grain size of 1.2 $\mu$m was used as in Comparative Example 3, a density was insufficiently enhanced in the sintering process. As a result, both the strength and thermal conductivity of the sintered body of Comparative Example 3 were reduced to undesired levels.

Examples 4–58 and Comparative Examples 4–11

Material mixtures of Examples 4–58 were prepared by varying the amounts of the same silicon nitride material powder, $Y_2O_3$ powder and MgO powder as used in Example 1, and various rare earth element oxide powders, CaO powder and SrO powder shown in Tables 2–4, to obtain compositions shown in Tables 2–4.

After the material mixtures were molded to form compacts and degrease the compacts under substantially the same conditions as in Example 1, the degreased compacts were sintered under the conditions as shown in Tables 2–4. As a result, the silicon nitride ceramic sintered bodies of Examples 4–58 were thus prepared.

The material mixtures of Comparative Examples 4–11 were respectively prepared as indicated in Table 4. More specifically, MgO was not added (Comparative Example 4), an excessively small amount of MgO was added (Comparative Example 5), an excessive amount of $Y_2O_3$ was added (Comparative Example 6), an excessive amount of MgO was added (Comparative Example 7), an excessive amount of $Er_2O_3$ was added (Comparative Example 8), an excessive amount of $Ho_2O_3$ was added (Comparative Example 9), an excessive amount of CaO was added (Comparative Example 10), and an excessive amount of SrO was added (Comparative Example 11). The material mixtures were then molded and degreased to form degreased compacts under substantially the same conditions as in Example 1, thereafter, the degreased compacts were subjected to sintering operation under conditions shown in Table 4, thus obtaining the silicon nitride sintered bodies of Comparative Examples 4–11.

The porosities, thermal conductivities (at 25° C.), average three-point bending strengths at a room temperature and ratio of crystal phase-to-grain boundary phase proportions (by X-ray diffraction method) of the silicon nitride ceramic sintered bodies according to Examples 4–48 and Comparative Examples 4–11 produced as described above were measured under the same conditions as in Example 1. The results shown in Tables 2–4 were obtained.

TABLE 2

| | Composition (wt. %) | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area Ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|
| Sample | $Si_3N_4$ | Rare Earth Element | MgO | Other Component | | | | | | | Worked Surface | Sintered Surface |
| Example | | | | | | | | | | | | |
| 4 | 95 | $Y_2O_3$ | 2 | 3 | 1800 × 8 × 5 | 25 | 1.0 | 30 | 0.28 | 72 | 880 | 760 |
| 5 | 94.7 | $Y_2O_3$ | 5 | 0.3 | 1900 × 8 × 9 | 50 | 0.9 | 52 | 0.38 | 90 | 855 | 725 |
| 6 | 94.5 | $Y_2O_3$ | 5 | 0.5 | 1900 × 8 × 9 | 50 | 0.5 | 51 | 0.35 | 90 | 850 | 730 |
| 7 | 94 | $Y_2O_3$ | 5 | 1 | 1800 × 8 × 5 | 50 | 1.2 | 47 | 0.23 | 88 | 880 | 755 |
| 8 | 94 | $Y_2O_3$ | 5 | 1 | 1900 × 8 × 9 | 50 | 0.2 | 50 | 0.29 | 90 | 900 | 765 |
| 9 | 93 | $Y_2O_3$ | 5 | 2 | 1750 × 8 × 0.1 | 25 | 1.8 | 35 | 0.20 | 76 | 840 | 785 |
| 10 | 93 | $Y_2O_3$ | 5 | 2 | 1800 × 8 × 5 | 50 | 0.3 | 30 | 0.25 | 80 | 1000 | 895 |
| 11 | 93 | $Y_2O_3$ | 5 | 2 | 1900 × 8 × 9 | 50 | 0.1 | 40 | 0.30 | 85 | 900 | 750 |
| 12 | 92 | $Y_2O_3$ | 5 | 3 | 1700 × 8 × 0.1 | 25 | 0.4 | 23 | 0.18 | 73 | 920 | 880 |
| 13 | 92 | $Y_2O_3$ | 5 | 3 | 1800 × 8 × 5 | 50 | 0.1 | 22 | 0.25 | 78 | 1030 | 900 |
| 14 | 92 | $Y_2O_3$ | 5 | 3 | 1850 × 8 × 5 | 25 | 0.1 | 25 | 0.28 | 80 | 995 | 875 |
| 15 | 91.5 | $Y_2O_3$ | 7.5 | 1 | 1850 × 8 × 5 | 50 | 0.8 | 45 | 0.26 | 88 | 910 | 790 |
| 16 | 91.5 | $Y_2O_3$ | 7.5 | 1 | 1900 × 8 × 9 | 100 | 0.1 | 44 | 0.32 | 89 | 870 | 740 |
| 17 | 90.5 | $Y_2O_3$ | 7.5 | 2 | 1800 × 8 × 5 | 50 | 0.3 | 32 | 0.26 | 80 | 950 | 880 |
| 18 | 90.5 | $Y_2O_3$ | 7.5 | 2 | 1900 × 8 × 9 | 50 | 0.1 | 35 | 0.28 | 84 | 890 | 785 |
| 19 | 88 | $Y_2O_3$ | 10 | 2 | 1850 × 8 × 5 | 50 | 0.3 | 35 | 0.23 | 83 | 845 | 750 |
| 20 | 91.5 | $Er_2O_3$ | 5 | 1 | 1800 × 8 × 5 | 50 | 0.1 | 28 | 0.27 | 73 | 885 | 760 |
| 21 | 91.5 | $Er_2O_3$ | 7.5 | 1 | 1850 × 8 × 5 | 100 | 0.1 | 32 | 0.27 | 80 | 920 | 815 |
| 22 | 89 | $Er_2O_3$ | 10 | 1 | 1800 × 8 × 5 | 50 | 0.2 | 49 | 0.22 | 92 | 935 | 820 |
| 23 | 89 | $Er_2O_3$ | 10 | 1 | 1900 × 8 × 9 | 50 | 0.1 | 52 | 0.30 | 94 | 880 | 765 |
| 24 | 86.5 | $Er_2O_3$ | 12.5 | 1 | 1800 × 8 × 5 | 50 | 0.3 | 50 | 0.23 | 93 | 900 | 800 |
| 25 | 86.5 | $Er_2O_3$ | 12.5 | 1 | 1850 × 8 × 5 | 50 | 0.2 | 52 | 0.28 | 94 | 910 | 785 |
| 26 | 86.5 | $Er_2O_3$ | 12.5 | 1 | 1900 × 8 × 9 | 50 | 0.1 | 55 | 0.31 | 98 | 850 | 735 |
| 27 | 85.5 | $Er_2O_3$ | 12.5 | 2 | 1750 × 8 × 0.1 | 50 | 0.5 | 36 | 0.20 | 84 | 900 | 845 |
| 28 | 85.5 | $Er_2O_3$ | 12.5 | 2 | 1800 × 8 × 5 | 50 | 0.2 | 38 | 0.22 | 88 | 980 | 900 |
| 29 | 85.5 | $Er_2O_3$ | 12.5 | 2 | 1850 × 8 × 5 | 50 | 0.1 | 40 | 0.25 | 90 | 920 | 800 |
| 30 | 85.5 | $Er_2O_3$ | 12.5 | 2 | 1900 × 8 × 9 | 50 | 0.1 | 48 | 0.29 | 94 | 895 | 770 |

TABLE 3

| | Composition (wt. %) | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area Ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|
| Sample | $Si_3N_4$ | Rare Earth Element | MgO | Other Component | | | | | | | Worked Surface | Sintered Surface |
| Example | | | | | | | | | | | | |
| 31 | 83 | $Er_2O_3$ | 15 | 2 | 1850 × 8 × 9 | 50 | 1.0 | 40 | 0.28 | 89 | 845 | 750 |
| 32 | 83 | $Er_2O_3$ | 15 | 2 | 1900 × 8 × 9 | 50 | 0.4 | 42 | 0.35 | 92 | 850 | 750 |
| 33 | 80.5 | $Er_2O_3$ | 17.5 | 2 | 1900 × 8 × 9 | 50 | 2.0 | 39 | 0.37 | 89 | 840 | 725 |
| 34 | 89 | $Ho_2O_3$ | 10 | 1 | 1800 × 8 × 5 | 50 | 0.2 | 40 | 0.21 | 90 | 950 | 780 |

TABLE 3-continued

| | | Composition (wt. %) | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area Ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|
| Sample | Si$_3$N$_4$ | Rare Earth Element | MgO | Other Component | | | | | | | Worked Surface | Sintered Surface |
| 35 | 89 | Ho$_2$O$_3$ 10 | 1 | | 1900 × 8 × 9 | 50 | 0.1 | 42 | 0.29 | 92 | 900 | 755 |
| 36 | 83 | Ho$_2$O$_3$ 15 | 2 | | 1850 × 8 × 5 | 50 | 1.2 | 38 | 0.25 | 89 | 850 | 765 |
| 37 | 83 | Ho$_2$O$_3$ 15 | 2 | | 1900 × 8 × 9 | 50 | 0.5 | 45 | 0.32 | 93 | 880 | 825 |
| 38 | 89 | Ho$_2$O$_3$ 10 | 1 | | 1800 × 8 × 5 | 50 | 0.3 | 43 | 0.22 | 90 | 915 | 840 |
| 39 | 89 | Yb$_2$O$_3$ 10 | 1 | | 1850 × 8 × 5 | 50 | 0.1 | 46 | 0.26 | 93 | 950 | 880 |
| 40 | 83 | Yb$_2$O$_3$ 15 | 2 | | 1850 × 8 × 5 | 50 | 1.3 | 38 | 0.25 | 87 | 875 | 755 |
| 41 | 83 | Yb$_2$O$_3$ 15 | 2 | | 1900 × 8 × 9 | 50 | 0.5 | 40 | 0.30 | 90 | 865 | 755 |
| 42 | 89 | Dy$_2$O$_3$ 10 | 1 | | 1800 × 8 × 5 | 50 | 0.2 | 38 | 0.22 | 88 | 970 | 870 |
| 43 | 86.5 | Dy$_2$O$_3$ 12.5 | 1 | | 1850 × 8 × 5 | 50 | 0.3 | 40 | 0.27 | 90 | 960 | 835 |
| 44 | 86.5 | Dy$_2$O$_3$ 12.5 | 1 | | 1900 × 8 × 9 | 50 | 0.1 | 41 | 0.32 | 92 | 890 | 750 |
| 45 | 85.5 | Sm$_2$O$_3$ 12.5 | 2 | | 1850 × 8 × 5 | 50 | 0.3 | 39 | 0.28 | 90 | 900 | 800 |
| 46 | 86.5 | Nd$_2$O$_3$ 12.5 | 1 | | 1850 × 8 × 5 | 50 | 0.3 | 42 | 0.28 | 89 | 915 | 805 |
| 47 | 86.5 | Pr$_6$O$_{11}$ 12.5 | 1 | | 1850 × 8 × 5 | 50 | 0.2 | 40 | 0.26 | 90 | 940 | 825 |
| 48 | 86.5 | CeO$_2$ 12.5 | 1 | | 1850 × 8 × 5 | 50 | 0.3 | 37 | 0.25 | 87 | 850 | 750 |
| 49 | 89.6 | Y$_2$O$_3$ 3.5 Er$_2$O$_3$ 6.5 | 0.5 | | 1875 × 8 × 5 | 50 | 1.0 | 40 | 0.28 | 85 | 855 | 750 |
| 50 | 89 | Y$_2$O$_3$ 3.5 Er$_2$O$_3$ 6.5 | 1 | | 1800 × 8 × 5 | 50 | 0.5 | 38 | 0.22 | 83 | 970 | 880 |
| 51 | 89 | Y$_2$O$_3$ 3.5 Er$_2$O$_3$ 6.5 | 1 | | 1850 × 8 × 5 | 25 | 0.1 | 45 | 0.25 | 90 | 910 | 800 |
| 52 | 89 | Y$_2$O$_3$ 3.5 Er$_2$O$_3$ 6.5 | 1 | | 1900 × 8 × 9 | 25 | 0.1 | 50 | 0.28 | 95 | 880 | 755 |

TABLE 4

| | | Composition (wt. %) | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area Ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|---|
| Sample | Si$_3$N$_4$ | Rare Earth Element | MgO | Other Component | | | | | | | | Worked Surface | Sintered Surface |
| Example | | | | | | | | | | | | | |
| 53 | 88 | Y$_2$O$_3$ 3.5 Er$_2$O$_3$ 6.5 | 2 | | | 1750 × 8 × 0.1 | 50 | 0.9 | 22 | 0.18 | 75 | 850 | 800 |
| 54 | 88 | Y$_2$O$_3$ 3.5 Er$_2$O$_3$ 6.5 | 2 | | | 1800 × 8 × 5 | 50 | 0.2 | 26 | 0.22 | 78 | 950 | 895 |
| 55 | 88 | Y$_2$O$_3$ 3.5 Er$_2$O$_3$ 6.5 | 2 | | | 1850 × 8 × 5 | 25 | 0.1 | 30 | 0.25 | 81 | 900 | 800 |
| 56 | 92 | Y$_2$O$_3$ 5 | 2 | CaO | 1 | 1750 × 8 × 0.1 | 50 | 0.3 | 21 | 0.20 | 73 | 950 | 900 |
| 57 | 92 | Y$_2$O$_3$ 5 | 2 | SrO | 1 | 1750 × 8 × 0.1 | 50 | 0.4 | 21 | 0.20 | 75 | 935 | 880 |
| 58 | 92 | Y$_2$O$_3$ 5 | 1 | CaO SrO | 1 1 | 1750 × 8 × 0.1 | 50 | 0.8 | 28 | 0.18 | 79 | 920 | 865 |
| Comparative Example | | | | | | | | | | | | | |
| 4 | 95 | Y$_2$O$_3$ 5 | 0 | | | 1900 × 8 × 5 | 50 | 0.5 | 65 | 0.60 | 90 | 800 | 590 |
| 5 | 94.9 | Y$_2$O$_3$ 5 | 0.1 | | | 1850 × 8 × 5 | 50 | 4.5 | 60 | 0.50 | 80 | 720 | 580 |
| 6 | 97 | Y$_2$O$_3$ 1 | 2 | | | 1900 × 8 × 9 | 50 | 3.8 | 19 | 0.40 | 65 | 650 | 515 |
| 7 | 91 | Y$_2$O$_3$ 5 | 4 | | | 1750 × 8 × 0.1 | 50 | 0.1 | 0 | 0.32 | 60 | 1000 | 860 |
| 8 | 78 | Er$_2$O$_3$ 20 | 2 | | | 1850 × 8 × 5 | 50 | 5.5 | 35 | 0.34 | 75 | 700 | 565 |
| 9 | 78 | Ho$_2$O$_3$ 20 | 2 | | | 1850 × 8 × 5 | 50 | 6.0 | 32 | 0.38 | 73 | 680 | 550 |
| 10 | 91 | Y$_2$O$_3$ 5 | 2 | CaO | 2 | 1750 × 8 × 0.1 | 50 | 0.2 | 5 | 0.28 | 60 | 950 | 800 |
| 11 | 91 | Y$_2$O$_3$ 5 | 2 | SrO | 2 | 1750 × 8 × 0.1 | 50 | 0.2 | 5 | 0.25 | 63 | 970 | 830 |

As is apparent from the results shown in Tables 2–4, the sintered bodies of Examples 4–58, which contained predetermined amount of rare earth element oxide, MgO, CaO, SrO, and which were cooled at predetermined cooling rates after the sintering process, achieved sufficiently high strengths and high thermal conductivities.

In particular, as is clear from a comparison with Comparative Example 4 to which MgO is not added, the sintered bodies of respective Examples each containing a predetermined amount of MgO have an excellent surface characteristic, so that the sintered bodies have a high bending strength even in a state after completion of the sintering operation.

On the other hand, as shown in Comparative Examples 4–11, when at least one component of rare earth element oxide, MgO, CaO, SrO was added to the sintered bodies at an excessively small amount or excessive amount, it was confirmed that the sintered bodies failed to achieve a sufficiently high density, a high three-point bending strength, and high thermal conductivity because the grain boundary phase was excessive or a crystal phase-to-grain boundary phase proportion was excessively lowered.

EXAMPLES 59–61

5% by weight of $Y_2O_3$(yttrium oxide) powder as a sintering assistant agent having an average grain size of 0.7 $\mu$m, 2% by weight of $HfO_2$ (hafnium oxide) powder as a sintering assistant agent having an average grain size of 1 $\mu$m and 1.5% by weight of MgO (magnesium oxide) powder as a sintering assistant agent having an average grain size of 0.5 $\mu$m were added to a silicon nitride material powder containing 1.3% by weight of oxygen, 0.10% by weight of impurity cationic elements of Al, Li, Na, K, Fe, Ba, Mn, B in terms of total amount thereof and 97% by weight of alpha-phase type silicon nitride, and having an average grain size of 0.40 $\mu$m. The above-described material powder mixture was wet-blended in ethyl alcohol for 72 hours by using a silicon nitride ball and then dried to obtain a material mixture powder.

A predetermined amount of an organic binder was added to the material mixture powder, and then homogeneously mixed. The mixture was then press-molded under a molding pressure of 1,000 kg/cm$^2$ to obtain a plurality of molded compacts each having a size of 50 mm (length)×50 mm (width)×5 mm (thickness). After the compacts were degreased in air flowing atmosphere at 500° C. for 2 hours, the degreased compacts were sintered to enhance the density thereof, in the following manner. The degreased compacts were maintained at a temperature of 1,750° C. for 8 hours in a nitrogen gas atmosphere at 0.1 atm to form sintered bodies. While the sintered bodies were moderately cooled, the cooling rates were controlled to be 100° C./hr (Example 59), 50° C./hr (Example 60) and 25° C./hr (Example 61) by controlling the power supplied to the heating devices provided in sintering furnaces until the temperature inside the furnaces reached 1,500° C. As a result, silicon nitride ceramic sintered bodies of Examples 59–61 were thus prepared. In this case, as the sintering board used in the sintering operation, a sintering board having a surface roughness (Ra) of 0.7 $\mu$m was used.

COMPARATIVE EXAMPLE 12

A silicon nitride sintered body of Comparative Example 12 was prepared under substantially the same conditions as in Example 59, except that immediately after the sintering process is completed to enhance the density of the sintered body, the heating device was powered off to cool the sintered body at a cooling rate (about 500° C./hr) as performed by the conventional furnace cooling method.

COMPARATIVE EXAMPLE 13

A silicon nitride sintered body of Comparative Example 13 was prepared under substantially the same conditions as in Example 59, except for using a silicon nitride material powder having an average grain size of 0.60 $\mu$m and containing 1.5% by weight of oxygen, 0.6% by weight of the impurity cationic elements and 93% by weight of alpha-phase type silicon nitride.

COMPARATIVE EXAMPLE 14

A silicon nitride sintered body of Comparative Example 14 was prepared under substantially the same conditions as in Example 59, except for using a silicon nitride material powder having an average grain size of 1.2 $\mu$m and containing 1.7% by weight of oxygen, 0.7% by weight of the impurity cationic elements and 91% by weight of alpha-phase type silicon nitride.

The silicon nitride sintered bodies of Examples 59–61 and Comparative Examples 12–14 were examined to determine their porosities, thermal conductivities (at 25° C.), and three-bending strengths at a room temperature. Further, X-ray diffraction analysis of each sintered body was performed to determine the ratio of the crystal phase to the grain boundary phase. The results shown in Table 5 were obtained.

TABLE 5

| Sample | Cooling Rate until 1500° C. after sintering (° C./hr) | Porosity (%) | Crystal Phase Ratio to Grain Boundary Phase (Area Ratio) (%) | Surface Roughness of Sintered Surface Ra ($\mu$m) | Thermal Conductivity (W/m. K) | Three-Point Bending Strength (MPa) | |
|---|---|---|---|---|---|---|---|
| | | | | | | Worked Surface | Sintered Surface |
| Example 59 | 100 | 0.5 | 30 | 0.22 | 78 | 1200 | 1120 |
| Example 60 | 50 | 0.4 | 54 | 0.20 | 85 | 1150 | 1070 |
| Example 61 | 25 | 0.2 | 68 | 0.23 | 92 | 1030 | 960 |
| Comparative Example 12 | 500 | 0.3 | 14 | 0.30 | 68 | 1080 | 980 |
| Comparative Example 13 | 100 | 0.4 | 5 | 0.30 | 45 | 990 | 900 |
| Comparative Example 14 | 100 | 3.5 | 0 | 0.32 | 30 | 750 | 640 |

As is apparent from the results shown in Table 5, the silicon nitride ceramic sintered bodies of Examples 59–61, which were cooled at rates lower than the cooling rate in Comparative Example 12 immediately after the density-enhancing sintering process, had crystal phases formed in the grain boundary phases. When silicon nitride sintered body has a higher ratio of the crystal phase to the grain boundary phase, the sintered bodies having a higher strength, higher thermal conductivity and better heat-radiation characteristics.

On the other hand, when the cooling rate of a sintered body was set to be high to rapidly cool the sintered temperature as in Comparative Example 12, a ratio of crystal phase in the grain boundary phase was low to be 20 W/mK or less, and the thermal conductivity was reduced to an undesired level. When a silicon nitride material powder containing a large amount of aforementioned impurity cationic elements, that is, 0.6% by weight, was used as in Comparative Example 13, almost grain boundary phase was amorphous although the cooling rate was the same as in Example 59, thereby reducing the thermal conductivity.

When a coarse silicon nitride powder having an average grain size of 1.2 μm was used as in Comparative Example 14, a density was insufficiently enhanced in the sintering process. As a result, both the strength and thermal conductivity of the sintered body of Comparative Example 14 were reduced to undesired levels.

EXAMPLES 62–152 AND COMPARATIVE EXAMPLES 15–25

Material mixtures of Examples 62–152 were prepared by varying the amounts of the same silicon nitride material powder, $Y_2O_3$ powder, $HfO_2$ powder and MgO powder used in Example 59, and various rare earth element oxide powders, CaO powder, SrO powder and compound powder of Ti or the like shown in Tables 6–9, to obtain material mixtures having compositions shown in Tables 6–9.

After the material mixtures were molded to form compacts and degrease the compacts under substantially the same conditions as in Example 59, the degreased compacts were sintered under the conditions as shown in Tables 6–9. The silicon nitride ceramic sintered bodies of Examples 62–152 were thus prepared.

The material mixtures of Comparative Examples 15–25 were respectively prepared as indicated in Table 9. More specifically, an excessively small amount of $HfO_2$ was added (Comparative Example 15), MgO was not added (Comparative Example 16), an excessively small amount of MgO was added (Comparative Example 17), an excessive amount of $HfO_2$ was added (Comparative Example 18), an excessive amount of MgO was added (Comparative Example 19), an excessively small amount of $Y_2O_3$ was added (Comparative Example 20), an excessive amount of $Er_2O_3$ was added (Comparative Example 21), an excessively small amount of $Er_2O_3$ was added (Comparative Example 22), an excessive amount of CaO was added (Comparative Example 23), an excessive amount of SrO was added (Comparative Example 24), an excessive amount of $TiO_2$ was added (Comparative Example 25).

The material mixtures were molded and degreased to form compacts under substantially the same conditions as in Example 59, then the degreased compacts were sintered under conditions shown in Table 9, thus obtaining the silicon nitride sintered bodies of Comparative Examples 15–25.

The porosities, thermal conductivities (at 25° C.), three-point bending strengths at a room temperature and crystal phase-to-grain boundary phase proportions (by X-ray diffraction analysis) of the silicon nitride ceramic sintered bodies according to Examples 62–152 and Comparative Examples 15–25 produced as described above were measured under the same conditions as in Example 59. The results shown in Tables 6–9 were obtained.

TABLE 6

| | Composition (wt. %) | | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|---|
| Sample | $Si_3N_4$ | Rare Earth Element | | $HfO_2$ | MgO | Other Component | | | | | | | Worked Surface | Sintered Surface |
| Example | | | | | | | | | | | | | | |
| 62 | 94 | $Y_2O_3$ | 2 | 2 | 2 | | 1800 × 8 × 5 | 25 | 0.9 | 52 | 0.22 | 80 | 840 | 750 |
| 63 | 93 | $Y_2O_3$ | 3 | 2 | 2 | | 1800 × 8 × 5 | 50 | 0.4 | 54 | 0.21 | 83 | 905 | 815 |
| 64 | 93 | $Y_2O_3$ | 3 | 2 | 2 | | 1850 × 8 × 5 | 50 | 0.2 | 55 | 0.26 | 86 | 920 | 800 |
| 65 | 92.7 | $Y_2O_3$ | 5 | 0.3 | 2 | | 1850 × 8 × 5 | 50 | 0.3 | 40 | 0.25 | 84 | 1030 | 900 |
| 66 | 92.5 | $Y_2O_3$ | 5 | 0.5 | 2 | | 1750 × 8 0.1 | 50 | 0.6 | 36 | 0.18 | 78 | 960 | 925 |
| 67 | 92.5 | $Y_2O_3$ | 5 | 0.5 | 2 | | 1800 × 8 × 5 | 50 | 0.3 | 37 | 0.20 | 82 | 1080 | 980 |
| 68 | 92.5 | $Y_2O_3$ | 5 | 0.5 | 2 | | 1850 × 8 × 5 | 50 | 0.1 | 40 | 0.22 | 84 | 920 | 800 |
| 69 | 92 | $Y_2O_3$ | 5 | 1 | 2 | | 1750 × 8 × 0.1 | 50 | 0.4 | 39 | 0.19 | 80 | 1050 | 1000 |
| 70 | 92 | $Y_2O_3$ | 5 | 1 | 2 | | 1800 × 8 × 5 | 50 | 0.2 | 46 | 0.21 | 86 | 1100 | 1020 |
| 71 | 92 | $Y_2O_3$ | 5 | 1 | 2 | | 1850 × 8 × 5 | 50 | 0.1 | 50 | 0.23 | 91 | 980 | 900 |
| 72 | 92.7 | $Y_2O_3$ | 5 | 2 | 0.3 | | 1800 × 8 × 5 | 100 | 1.5 | 62 | 0.28 | 89 | 890 | 800 |
| 73 | 92.5 | $Y_2O_3$ | 5 | 2 | 0.5 | | 1800 × 8 × 5 | 50 | 1.3 | 63 | 0.25 | 90 | 920 | 855 |
| 74 | 92.5 | $Y_2O_3$ | 5 | 2 | 0.5 | | 1850 × 8 × 5 | 100 | 0.4 | 65 | 0.3 | 93 | 895 | 800 |
| 75 | 92.5 | $Y_2O_3$ | 5 | 2 | 0.5 | | 1900 × 8 × 9 | 50 | 0.1 | 65 | 0.35 | 94 | 855 | 750 |
| 76 | 92 | $Y_2O_3$ | 5 | 2 | 1 | | 1800 × 8 × 5 | 50 | 0.4 | 60 | 0.20 | 93 | 950 | 895 |
| 77 | 92 | $Y_2O_3$ | 5 | 2 | 1 | | 1850 × 8 × 5 | 50 | 0.2 | 63 | 0.22 | 99 | 910 | 800 |
| 78 | 92 | $Y_2O_3$ | 5 | 2 | 1 | | 1900 × 8 × 9 | 50 | 0.1 | 69 | 0.28 | 105 | 875 | 755 |
| 79 | 91 | $Y_2O_3$ | 5 | 2 | 2 | | 1700 × 8 0.1 | 50 | 1.2 | 49 | 0.15 | 76 | 900 | 880 |
| 80 | 91 | $Y_2O_3$ | 5 | 2 | 2 | | 1750 × 8 × 0.1 | 50 | 0.3 | 50 | 0.18 | 82 | 1160 | 1100 |
| 81 | 91 | $Y_2O_3$ | 5 | 2 | 2 | | 1800 × 8 × 5 | 50 | 0.2 | 60 | 0.20 | 90 | 1090 | 1015 |
| 82 | 91 | $Y_2O_3$ | 5 | 2 | 2 | | 1800 × 8 × 5 | 25 | 0.1 | 69 | 0.21 | 105 | 940 | 865 |
| 83 | 91 | $Y_2O_3$ | 5 | 2 | 2 | | 1850 × 8 × 5 | 50 | 0.1 | 60 | 0.24 | 98 | 925 | 820 |
| 84 | 91 | $Y_2O_3$ | 5 | 2 | 2 | | 1900 × 8 × 9 | 50 | 0.1 | 63 | 0.28 | 100 | 850 | 755 |
| 85 | 90 | $Y_2O_3$ | 5 | 2 | 3 | | 1650 × 8 × 0.1 | 25 | 0.3 | 33 | 0.15 | 75 | 1100 | 1075 |
| 86 | 90 | $Y_2O_3$ | 5 | 2 | 3 | | 1700 × 8 × 0.1 | 25 | 0.2 | 34 | 0.17 | 77 | 1080 | 1010 |
| 87 | 90 | $Y_2O_3$ | 5 | 2 | 3 | | 1750 × 8 0.1 | 50 | 0.1 | 36 | 0.18 | 80 | 1050 | 1000 |
| 88 | 90 | $Y_2O_3$ | 5 | 2 | 3 | | 1800 × 8 × 5 | 50 | 0.1 | 40 | 0.20 | 82 | 980 | 925 |

TABLE 7

| | Composition (wt. %) | | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|---|
| Sample | Si$_3$N$_4$ | Rare Earth Element | | HfO$_2$ | MgO | Other Component | | | | | | Worked Surface | Sintered Surface |
| Example | | | | | | | | | | | | | |
| 89 | 90 | Y$_2$O$_3$ | 5 | 3 | 3 | | 1800 × 8 × 5 | 50 | 0.2 | 35 | 0.24 | 80 | 940 | 865 |
| 90 | 90 | Y$_2$O$_3$ | 7.5 | 2 | 0.5 | | 1800 × 8 × 5 | 25 | 0.5 | 62 | 0.27 | 94 | 880 | 750 |
| 91 | 90 | Y$_2$O$_3$ | 7.5 | 2 | 0.5 | | 1850 × 8 × 5 | 50 | 0.3 | 65 | 0.30 | 100 | 915 | 760 |
| 92 | 90 | Y$_2$O$_3$ | 7.5 | 2 | 0.5 | | 1900 × 8 × 9 | 50 | 0.1 | 67 | 0.36 | 106 | 865 | 755 |
| 93 | 89.5 | Y$_2$O$_3$ | 7.5 | 2 | 1 | | 1750 × 8 × 0.1 | 25 | 0.2 | 62 | 0.20 | 95 | 990 | 940 |
| 94 | 89.5 | Y$_2$O$_3$ | 7.5 | 2 | 1 | | 1800 × 8 × 5 | 50 | 0.3 | 60 | 0.22 | 95 | 925 | 850 |
| 95 | 89.5 | Y$_2$O$_3$ | 7.5 | 2 | 1 | | 1850 × 8 × 5 | 50 | 0.2 | 62 | 0.26 | 99 | 870 | 780 |
| 96 | 89.5 | Y$_2$O$_3$ | 7.5 | 2 | 1 | | 1900 × 8 × 9 | 100 | 0.1 | 60 | 0.29 | 95 | 900 | 765 |
| 97 | 88.5 | Y$_2$O$_3$ | 7.5 | 2 | 2 | | 1750 × 8 × 0.1 | 25 | 0.1 | 52 | 0.19 | 83 | 1120 | 1075 |
| 98 | 88.5 | Y$_2$O$_3$ | 7.5 | 2 | 2 | | 1800 × 8 × 5 | 50 | 0.1 | 56 | 0.21 | 84 | 990 | 920 |
| 99 | 88.5 | Y$_2$O$_3$ | 10 | 2 | 2 | | 1850 × 8 × 5 | 50 | 0.3 | 60 | 0.22 | 98 | 915 | 800 |
| 100 | 89.5 | Er$_2$O$_3$ | 7.5 | 2 | 1 | | 1800 × 8 × 5 | 50 | 0.2 | 55 | 0.20 | 88 | 980 | 915 |
| 101 | 85 | Er$_2$O$_3$ | 12.5 | 2 | 0.5 | | 1800 × 8 × 5 | 25 | 0.3 | 65 | 0.23 | 96 | 935 | 850 |
| 102 | 85 | Er$_2$O$_3$ | 12.5 | 2 | 0.5 | | 1850 × 8 × 5 | 50 | 0.1 | 65 | 0.28 | 98 | 890 | 795 |
| 103 | 84.5 | Er$_2$O$_3$ | 12.5 | 2 | 1 | | 1750 × 8 × 0.1 | 50 | 0.6 | 60 | 0.18 | 89 | 910 | 865 |
| 104 | 84.5 | Er$_2$O$_3$ | 12.5 | 2 | 1 | | 1800 × 8 × 5 | 50 | 0.2 | 64 | 0.20 | 98 | 940 | 860 |
| 105 | 84.5 | Er$_2$O$_3$ | 12.5 | 2 | 1 | | 1850 × 8 × 5 | 50 | 0.1 | 64 | 0.24 | 100 | 915 | 810 |
| 106 | 82.5 | Ho$_2$O$_3$ | 15 | 2 | 0.5 | | 1800 × 8 × 5 | 50 | 1.5 | 65 | 0.28 | 98 | 880 | 820 |
| 107 | 82.5 | Ho$_2$O$_3$ | 15 | 2 | 0.5 | | 1850 × 8 × 5 | 50 | 0.1 | 67 | 0.30 | 100 | 920 | 800 |
| 108 | 82.5 | Ho$_2$O$_3$ | 15 | 2 | 0.5 | | 1900 × 8 × 9 | 25 | 0.1 | 69 | 0.34 | 114 | 880 | 755 |
| 109 | 82 | Ho$_2$O$_3$ | 15 | 2 | 1 | | 1750 × 8 × 0.1 | 25 | 1.4 | 63 | 0.20 | 93 | 900 | 850 |
| 110 | 82 | Ho$_2$O$_3$ | 15 | 2 | 1 | | 1800 × 8 × 5 | 50 | 0.1 | 65 | 0.22 | 106 | 940 | 860 |
| 111 | 82 | Ho$_2$O$_3$ | 15 | 2 | 1 | | 1850 × 8 × 5 | 50 | 0.1 | 68 | 0.24 | 110 | 920 | 800 |
| 112 | 82 | Ho$_2$O$_3$ | 15 | 2 | 1 | | 1900 × 8 × 9 | 50 | 0.1 | 68 | 0.29 | 100 | 875 | 755 |
| 113 | 78.6 | Ho$_2$O$_3$ | 17.5 | 2 | 1 | | 1750 × 8 × 0.1 | 50 | 2.2 | 55 | 0.18 | 88 | 855 | 760 |
| 114 | 78.5 | Ho$_2$O$_3$ | 17.5 | 2 | 1 | | 1850 × 8 × 5 | 50 | 0.3 | 60 | 0.20 | 98 | 900 | 825 |
| 115 | 82.5 | Yb$_2$O$_3$ | 15 | 2 | 0.5 | | 1800 × 8 × 5 | 50 | 0.5 | 66 | 0.23 | 100 | 900 | 845 |

TABLE 8

| | Composition (wt. %) | | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|---|
| Sample | Si$_3$N$_4$ | Rare Earth Element | | HfO$_2$ | MgO | Other Component | | | | | | Worked Surface | Sintered Surface |
| Example | | | | | | | | | | | | | |
| 116 | 82.5 | Yb$_2$O$_3$ | 15 | 2 | 0.5 | | 1850 × 8 × 5 | 50 | 0.1 | 68 | 0.30 | 115 | 920 | 820 |
| 117 | 82.5 | Yb$_2$O$_3$ | 15 | 2 | 0.5 | | 1900 × 8 × 9 | 50 | 0.1 | 65 | 0.37 | 104 | 845 | 735 |
| 118 | 82 | Yb$_2$O$_3$ | 15 | 2 | 1 | | 1750 × 8 × 0.1 | 50 | 1.0 | 60 | 0.16 | 93 | 910 | 875 |
| 119 | 82 | Yb$_2$O$_3$ | 15 | 2 | 1 | | 1800 × 8 × 5 | 50 | 0.1 | 63 | 0.19 | 103 | 950 | 890 |
| 120 | 82 | Yb$_2$O$_3$ | 15 | 2 | 1 | | 1800 × 8 × 5 | 25 | 0.1 | 67 | 0.20 | 112 | 925 | 875 |
| 121 | 90 | Dy$_2$O$_3$ | 7.5 | 2 | 0.5 | | 1850 × 8 × 5 | 100 | 0.1 | 40 | 0.28 | 78 | 990 | 850 |
| 122 | 87.5 | Dy$_2$O$_3$ | 10 | 2 | 0.5 | | 1850 × 8 × 5 | 50 | 0.1 | 48 | 0.30 | 89 | 935 | 825 |
| 123 | 82.5 | Dy$_2$O$_3$ | 15 | 2 | 0.5 | | 1800 × 8 × 5 | 50 | 1.8 | 50 | 0.25 | 89 | 840 | 760 |
| 124 | 82.5 | Dy$_2$O$_3$ | 15 | 2 | 0.5 | | 1850 × 8 × 5 | 50 | 0.1 | 63 | 0.32 | 100 | 895 | 740 |
| 125 | 82 | Dy$_2$O$_3$ | 15 | 2 | 1 | | 1750 × 8 × 0.1 | 50 | 1.0 | 58 | 0.17 | 85 | 870 | 840 |
| 126 | 82 | Dy$_2$O$_3$ | 15 | 2 | 1 | | 1800 × 8 × 5 | 50 | 0.3 | 60 | 0.20 | 98 | 975 | 910 |
| 127 | 82 | Dy$_2$O$_3$ | 15 | 2 | 1 | | 1850 × 8 × 5 | 50 | 0.1 | 61 | 0.22 | 99 | 900 | 820 |
| 128 | 87 | Sm$_2$O$_3$ | 10 | 2 | 1 | | 1850 × 8 × 5 | 50 | 0.2 | 60 | 0.23 | 98 | 900 | 800 |
| 129 | 87 | Gd$_2$O$_3$ | 10 | 2 | 1 | | 1850 × 8 × 5 | 50 | 0.1 | 61 | 0.22 | 98 | 915 | 810 |
| 130 | 87 | Nd$_2$O$_3$ | 10 | 2 | 1 | | 1850 × 8 × 5 | 50 | 0.1 | 50 | 0.23 | 94 | 930 | 825 |
| 131 | 87 | Pr$_6$O$_{11}$ | 10 | 2 | 1 | | 1850 × 8 × 5 | 50 | 0.1 | 59 | 0.23 | 95 | 955 | 855 |
| 132 | 87 | CeO$_2$ | 10 | 2 | 1 | | 1850 × 8 × 5 | 50 | 0.1 | 43 | 0.22 | 84 | 990 | 890 |

TABLE 8-continued

| Sample | Composition (wt. %) | | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area ratio) (%) | Surface Roughness of Sintered Surface Ra (μm) | Thermal Conductivity (W/m. K) | Three-Point Bending Strength (MPa) | |
|---|---|---|---|---|---|---|---|---|---|---|---|---|---|
| | Si$_3$N$_4$ | Rare Earth Element | | HfO$_2$ | MgO | Other Component | | | | | | | Worked Surface | Sintered Surface |
| 133 | 87.5 | Y$_2$O$_3$ Er$_2$O$_3$ | 3.5 6.5 | 2 | 0.5 | | 1850 × 8 × 5 | 50 | 1.8 | 56 | 0.25 | 90 | 830 | 725 |
| 134 | 87.5 | Y$_2$O$_3$ Er$_2$O$_3$ | 3.5 6.5 | 2 | 0.5 | | 1900 × 8 × 9 | 50 | 0.1 | 60 | 0.33 | 97 | 840 | 730 |
| 135 | 87 | Y$_2$O$_3$ Er$_2$O$_3$ | 3.5 6.5 | 2 | 1 | | 1800 × 8 × 5 | 50 | 0.9 | 59 | 0.20 | 95 | 985 | 915 |
| 136 | 87 | Y$_2$O$_3$ Er$_2$O$_3$ | 3.5 6.5 | 2 | 1 | | 1850 × 8 × 5 | 50 | 0.1 | 60 | 0.25 | 98 | 900 | 810 |
| 137 | 87 | Y$_2$O$_3$ Er$_2$O$_3$ | 3.5 6.5 | 2 | 1 | | 1900 × 8 × 9 | 50 | 0.1 | 62 | 0.29 | 100 | 870 | 755 |

TABLE 9

| Sample | Composition (wt. %) | | | | | | Sintering Condition Temperature (° C.) × Time (hr) × Pressure (atm) | Cooling Rate until 1500° C. after sintering (° C./hr) | Porosity (%) | Crystal Phase Ratio to Grain Boundary Phase (Area ratio) (%) |
|---|---|---|---|---|---|---|---|---|---|---|
| | Si$_3$N$_4$ | Rare Earth Element | | HfO$_2$ | MgO | Other Component | | | | |
| Example | | | | | | | | | | |
| 138 | 85 | Y$_2$O$_3$ Er$_2$O$_3$ | 3.5 6.5 | 2 | 3 | | 1600 × 8 × 0.1 | 25 | 0.9 | 31 |
| 139 | 85 | Y$_2$O$_3$ Er$_2$O$_3$ | 3.5 6.5 | 2 | 3 | | 1700 × 8 × 0.1 | 50 | 0.1 | 36 |
| 140 | 85 | Y$_2$O$_3$ Er$_2$O$_3$ | 3.5 6.5 | 2 | 3 | | 1750 × 8 × 0.1 | 50 | 0.1 | 41 |
| 141 | 92 | Y$_2$O$_3$ | 5 | 2 | 0.5 | CaO 0.5 | 1850 × 8 × 5 | 50 | 0.5 | 62 |
| 142 | 91 | Y$_2$O$_3$ | 5 | 2 | 1 | SrO 1 | 1850 × 8 × 5 | 50 | 0.3 | 58 |
| 143 | 89.5 | Y$_2$O$_3$ | 5 | 2 | 2 | SrO 1.5 | 1800 × 8 × 5 | 50 | 0.2 | 50 |
| 144 | 90.5 | Y$_2$O$_3$ | 5 | 2 | 2 | TiO$_2$ 0.5 | 1750 × 8 × 0.1 | 50 | 0.2 | 47 |
| 145 | 89.5 | Y$_2$O$_3$ | 5 | 2 | 2 | TiO$_2$ 1.5 | 1750 × 8 × 0.1 | 50 | 0.1 | 30 |
| 146 | 90.5 | Y$_2$O$_3$ | 5 | 2 | 2 | ZrO$_2$ 0.5 | 1750 × 8 × 0.1 | 50 | 0.2 | 45 |
| 147 | 90.5 | Y$_2$O$_3$ | 5 | 2 | 2 | WO$_3$ 0.5 | 1750 × 8 × 0.1 | 50 | 0.4 | 46 |
| 148 | 90.5 | Y$_2$O$_3$ | 5 | 2 | 2 | MoO$_3$ 0.5 | 1750 × 8 × 0.1 | 50 | 0.3 | 43 |
| 149 | 90.5 | Y$_2$O$_3$ | 5 | 2 | 2 | Nb$_2$O$_5$ 0.5 | 1750 × 8 × 0.1 | 50 | 0.3 | 43 |
| 150 | 90.5 | Y$_2$O$_3$ | 5 | 2 | 2 | Ta$_2$O$_5$ 0.5 | 1750 × 8 × 0.1 | 50 | 0.4 | 46 |
| 151 | 90.5 | Y$_2$O$_3$ | 5 | 2 | 2 | Cr$_2$O$_3$ 0.5 | 1750 × 8 × 0.1 | 50 | 0.2 | 45 |
| 152 | 90.5 | Y$_2$O$_3$ | 5 | 2 | 2 | V$_2$O$_5$ 0.5 | 1750 × 8 × 0.1 | 50 | 0.3 | 42 |
| Comparative Example | | | | | | | | | | |
| 15 | 92.9 | Y$_2$O$_3$ | 5 | 0.1 | 2 | | 1750 × 8 × 0.1 | 50 | 2.7 | 39 |
| 16 | 93 | Y$_2$O$_3$ | 5 | 2 | 0 | | 1900 × 8 × 9 | 50 | 0.5 | 55 |
| 17 | 92.9 | Y$_2$O$_3$ | 5 | 2 | 0.1 | | 1800 × 8 × 5 | 50 | 2.7 | 50 |
| 18 | 88 | Y$_2$O$_3$ | 5 | 4 | 3 | | 1750 × 8 × 0.1 | 50 | 0.1 | 18 |
| 19 | 89 | Y$_2$O$_3$ | 5 | 2 | 4 | | 1750 × 8 × 0.1 | 50 | 0.1 | 18 |
| 20 | 95 | Y$_2$O$_3$ | 1 | 2 | 2 | | 1850 × 8 × 5 | 50 | 2.8 | 30 |
| 21 | 76 | Er$_2$O$_3$ | 20 | 2 | 2 | | 1850 × 8 × 5 | 50 | 2.9 | 48 |
| 22 | 95 | Er$_2$O$_3$ | 1 | 2 | 2 | | 1850 × 8 × 5 | 50 | 3.5 | 25 |
| 23 | 89 | Y$_2$O$_3$ | 5 | 2 | 2 | CaO 2 | 1750 × 8 × 0.1 | 50 | 0.1 | 16 |
| 24 | 89 | Y$_2$O$_3$ | 5 | 2 | 2 | SrO 2 | 1750 × 8 × 0.1 | 50 | 0.1 | 18 |
| 25 | 89 | Y$_2$O$_3$ | 5 | 2 | 2 | TiO$_2$ 2 | 1750 × 8 × 0.1 | 50 | 0.1 | 18 |

| Sample | Surface Roughness of Sintered Surface Ra (μm) | Thermal Conductivity (W/m. K) | Three-Point Bending Strength (MPa) | |
|---|---|---|---|---|
| | | | Worked Surface | Sintered Surface |
| Example | | | | |
| 138 | 0.13 | 75 | 900 | 850 |
| 139 | 0.16 | 79 | 1000 | 875 |
| 140 | 0.22 | 82 | 985 | 825 |
| 141 | 0.28 | 98 | 890 | 755 |
| 142 | 0.24 | 92 | 920 | 785 |
| 143 | 0.18 | 83 | 980 | 800 |

TABLE 9-continued

| | | | | |
|---|---|---|---|---|
| 144 | 0.19 | 80 | 1140 | 1000 |
| 145 | 0.22 | 75 | 1000 | 885 |
| 146 | 0.19 | 77 | 1080 | 950 |
| 147 | 0.18 | 80 | 1100 | 990 |
| 148 | 0.18 | 81 | 1060 | 915 |
| 149 | 0.20 | 81 | 1080 | 940 |
| 150 | 0.20 | 83 | 1050 | 900 |
| 151 | 0.20 | 80 | 1080 | 915 |
| 152 | 0.24 | 76 | 960 | 845 |
| Comparative Example | | | | |
| 15 | 0.25 | 74 | 740 | 600 |
| 16 | 0.50 | 90 | 820 | 585 |
| 17 | 0.45 | 78 | 735 | 570 |
| 18 | 0.20 | 69 | 895 | 720 |
| 19 | 0.21 | 69 | 880 | 710 |
| 20 | 0.23 | 75 | 740 | 590 |
| 21 | 0.24 | 76 | 735 | 590 |
| 22 | 0.22 | 70 | 700 | 575 |
| 23 | 0.20 | 69 | 900 | 730 |
| 24 | 0.21 | 68 | 930 | 755 |
| 25 | 0.20 | 68 | 950 | 790 |

As is apparent from the results shown in Tables 6–9, the sintered bodies according to Examples 62–152, which contained various rare earth element oxides, $HfO_2$, MgO, and, if necessary, a predetermined amount of CaO, SrO, compound of Ti or the like and which were cooled at predetermined cooling rates after the sintering process, achieved sufficiently high strengths and high thermal conductivities.

In particular, as is clear from a comparison with Comparative Examples 16 and 17 to which MgO is not added, the sintered bodies of respective Examples each containing a predetermined amount of MgO have an excellent surface characteristic, so that the sintered bodies have a high bending strength even in a state after completion of the sintering operation.

On the other hand, as shown in Comparative Examples 15–25, when at least one component of rare earth element oxide, $HfO_2$, MgO, CaO, SrO, and compound of Ti or the like was added to the sintered bodies at an excessively small amount or excessive amount, it was confirmed that the sintered bodies failed to achieve a sufficiently high density, a high three-point bending strength, and high thermal conductivity because the grain boundary phase was excessive or a crystal phase-to-grain boundary phase proportion was excessively lowered.

EXAMPLES 62–152 AND COMPARATIVE EXAMPLES 15–25

Material mixtures of Examples 153–159 were prepared by varying the amounts of the same silicon nitride material powder, $Y_2O_3$ powder, $HfO_2$ powder and MgO powder used in Example 59, and $Er_2O_3$ powders, CaO powder, SrO powder and compound powder of Ti or the like shown in Table 10, to obtain material mixtures having compositions shown in Table 10.

Thus obtained material mixtures were then press-molded under the same conditions as in Example 59 thereby to obtain a plurality of thin-plate type molded compacts each having a size of 50 mm (length)×50 mm (width)×0.6 mm (thickness). After the compacts were degreased under substantially the same conditions as in Example 59, the degreased compacts were sintered under the conditions as shown in Table 10. The silicon nitride ceramic sintered bodies of Examples 153–159 were thus prepared.

The material mixtures of Comparative Examples 26–28 were respectively prepared as indicated in Table 10. More specifically, MgO was not added (Comparative Example 26), an excessively small amount of MgO was added (Comparative Example 27), and an excessive amount of MgO was added (Comparative Example 28).

Thus prepared material mixtures were molded and degreased to form compacts under substantially the same conditions as in Example 153, then the degreased compacts were sintered under conditions shown in Table 10, thus obtaining the silicon nitride sintered bodies of Comparative Examples 26–28.

The porosities, thermal conductivities (at 25° C.), three-point bending strengths at a room temperature and crystal phase-to-grain boundary phase proportions (by X-ray diffraction analysis) of the silicon nitride ceramic sintered bodies according to Examples 153–159 and Comparative Examples 26–28 produced as described above were measured under the same conditions as in Example 59. The results shown in Table 10 were obtained.

TABLE 10

| | Composition (wt. %) | | | | | Sintering Condition Temperature (° C.) × | Cooling Rate until 1500° C. | | Crystal Phase Ratio to |
|---|---|---|---|---|---|---|---|---|---|
| Sample | $Si_3N_4$ | Rare Earth Element | $HfO_2$ | MgO | Other Component | Time (hr) × Pressure (atm) | after sintering (° C./hr) | Porosity (%) | Grain Boundary Phase (Area ratio) (%) |
| Example | | | | | | | | | |
| 153 | 93.5 | $Y_2O_3$ 5 | | 1.5 | | 1800 × 8 × 7.5 | 50 | 0.3 | 31 |
| 154 | 89 | $Er_2O_3$ 10 | | 1 | | 1800 × 8 × 5 | 50 | 0.2 | 49 |
| 155 | 92 | $Y_2O_3$ 5 | | 2 | CaO 1 | 1750 × 8 × 0.1 | 50 | 0.2 | 22 |

TABLE 10-continued

| | | | | | | | | | | |
|---|---|---|---|---|---|---|---|---|---|---|
| 156 | 91.5 | $Y_2O_3$ | 5 | 2 | 1.5 | | | 1750 × 8 × 0.1 | 50 | 0.3 | 56 |
| 157 | 90 | $Y_2O_3$ | 5 | 2 | 3 | | | 1650 × 8 × 0.1 | 50 | 0.3 | 34 |
| 158 | 89.5 | $Y_2O_3$ | 5 | 2 | 2 | SrO | 1.5 | 1800 × 8 × 5 | 50 | 0.2 | 50 |
| 159 | 90.5 | $Y_2O_3$ | 5 | 2 | 2 | $TiO_2$ | 0.5 | 1750 × 8 × 0.1 | 50 | 0.2 | 48 |
| Comparative Example | | | | | | | | | | | |
| 26 | 93 | $Y_2O_3$ | 5 | 2 | 0 | | | 1900 × 8 × 9 | 50 | 0.4 | 56 |
| 27 | 93 | $Y_2O_3$ | 5 | 2 | 0.1 | | | 1800 × 8 × 5 | 50 | 2.6 | 50 |
| 28 | 89 | $Y_2O_3$ | 5 | 2 | 4 | | | 1750 × 8 × 0.1 | 50 | 0.1 | 19 |

| | Surface Roughness of Sintered Surface | Thermal Conductivity | Three-Point Bending Strength (MPa) | |
|---|---|---|---|---|
| Sample | Ra (μm) | (W/m. K) | Worked Surface | Sintered Surface |
| Example | | | | |
| 153 | 0.26 | 81 | 1000 | 920 |
| 154 | 0.22 | 92 | 845 | 750 |
| 155 | 0.22 | 75 | 880 | 800 |
| 156 | 0.2 | 85 | 1050 | 970 |
| 157 | 0.15 | 76 | 1020 | 985 |
| 158 | 0.18 | 85 | 900 | 800 |
| 159 | 0.2 | 80 | 1040 | 945 |
| Comparative Example | | | | |
| 26 | 0.53 | 92 | 760 | 560 |
| 27 | 0.46 | 78 | 680 | 500 |
| 28 | 0.22 | 69 | 800 | 745 |

As is apparent from the results shown in Table 10, the sintered bodies according to Examples 153–159, which contained various rare earth element oxides, $HfO_2$, MgO, and, if necessary, a predetermined amount of CaO, SrO, compound of Ti or the like and which were cooled at predetermined small cooling rates after the sintering process, achieved sufficiently high strengths and high thermal conductivities.

In particular, as is clear from a comparison with Comparative Examples 26 and 28 to which MgO is not added or an excessively small amount of MgO is added, the sintered bodies of respective Examples each containing a predetermined amount of MgO have an excellent surface characteristic, so that the sintered bodies have a high bending strength even in a state after completion of the sintering operation, and it is not necessary to grind the sintered surface so as to expose a worked surface having a high strength.

On the other hand, as shown in Comparative Examples 26–28, when MgO was added to the sintered bodies at an excessively small amount or excessive amount, it was confirmed that the sintered bodies failed to achieve a sufficiently high density, a high three-point bending strength, and high thermal conductivity because the grain boundary phase was excessive or a crystal phase-to-grain boundary phase proportion was excessively lowered.

As has been described above, according to a high thermal conductive silicon nitride sintered body and a method of producing the same of the present invention, the sintered body is produced in such a manner that predetermined amounts of rare earth element, Hf compound, MgO, if necessary, at least one of CaO and SrO, and if necessary, at least one element selected from Ti, Zr, V, Nb, Ta, Cr, Mo, W are added to a fine silicon nitride powder having predetermined purity and grain size, and the cooling rate for the sintered body after sintering operation is set to 100° C./Hr or less. Therefore, unlike the conventional case where the sintered body is rapidly cooled by furnace-cooling, the grain boundary phase is changed from amorphous state to a phase containing a crystal phase, so that a silicon nitride sintered body having a high density, high strength and a high thermal conductivity can be obtained. In particular, since the sintered body contains a predetermined amount of Mg, a sintered surface having a good surface characteristics can be obtained, and a high strength characteristics can be obtained without subjecting any grinding work. Accordingly, the silicon nitride sintered body is very effective as a substrate such as a semiconductor substrate or a substrate for a heat-radiating plate.

What is claimed is:

1. A high thermal conductive silicon nitride sintered body characterized by containing: 2.0 to 17.5% by weight of a rare earth element in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, comprising a silicon nitride catalyst and a grain boundary phase, and having a ratio of a crystal compound phase formed in the grain boundary phase to the entire grain boundary phase of at least 20%, wherein said high thermal conductive silicon nitride sintered body has a thermal conductivity of 70 W/m·K or more.

2. A high thermal conductive silicon nitride sintered body according to claim 1, wherein said high thermal conductive silicon nitride sintered body further contains at most 1.5% by weight of at least one of calcium (Ca) and strontium (Sr) in terms of an oxide thereof.

3. A high thermal conductive silicon nitride sintered body according to claim 1, wherein said sintered body has a porosity of at most 2.5% by volume, and a three-point bending strength of at least 700 MPa at a room temperature.

4. A high thermal conductive silicon nitride sintered body according to claim 1, wherein said high thermal conductive silicon nitride sintered body further contains 0.3 to 3.0% by weight hafnium (Hf) in terms of an oxide thereof.

5. A high thermal conductive silicon nitride sintered body according to claim 1, wherein said high thermal conductive silicon nitride sintered body further contains at most 1.5% by weight of at least one element selected from the group consisting of Ti, Zr, V, Nb, Ta, Cr, Mo and W in terms of the amount of an oxide thereof.

6. A method of producing a high thermal conductive silicon nitride sintered body, comprising the steps of: forming a compact by molding a mixture obtained by adding 2.0 to 17.5% by weight of a rare earth element in terms of the amount of an oxide thereof, and 0.3 to 3.0% by weight of Mg in terms of the amount of an oxide thereof, to a silicon nitride powder which contains at most 1.7% by weight of oxygen, at most 0.3% by weight of Al, Li, Na, K, Fe, Ba, Mn and B as impurity cationic elements in terms of total amount thereof, and at least 90% by weight of alpha-phase type silicon nitride, and which has an average grain size of at most 1.0 μm; degreasing the compact; sintering the compact at a temperature of 1,700–1,900° C. under an atmosphere of normal pressure or pressurized atmosphere thereby to form a sintered body; and moderately cooling the sintered body at a cooling rate of at most 100° C. per hour until the temperature is reduced to a point at which a liquid phase formed by the rare earth element and MgO during the sintering step solidifies.

7. A method of producing a high thermal conductive silicon nitride sintered body according to claim 6, wherein at most 1.5% by weight of at least one of calcium (Ca) and strontium (Sr) in terms of an oxide thereof is added to said silicon nitride powder.

8. A high thermal conductive silicon nitride sintered body containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and having a thermal conductivity of at least 70 W/m·K.

9. A high thermal conductive silicon nitride sintered body containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and comprising a silicon nitride crystal and a grain boundary phase, and having a ratio of a crystal compound phase formed in the grain boundary phase to the entire grain boundary phase of at least 20%.

10. A high thermal conductive silicon nitride sintered body containing: 2.0 to 17.5% by weight of a rare earth element in terms of the amount of an oxide thereof; 0.3 to 3.0% by weight of Hf in terms of the amount of an oxide thereof; 0.3 to 3.0% by weight of Mg in terms of the amount of an oxide thereof; and at most 0.3% by weight of Al, Li, Na, K, Fe, Ba, Mn and B as impurity cationic elements in terms of total amount thereof, and comprising a silicon nitride crystal and a grain boundary phase, and having a ratio of a crystal compound phase formed in the grain boundary phase to the entire grain boundary phase of at least 20%, and having a thermal conductivity of at least 70 W/m·K.

11. A high thermal conductive silicon nitride sintered body according to any one of claims 8 to 10, wherein said high thermal conductive silicon nitride sintered body further contains at most 1.5% by weight of at least one of calcium (Ca) and strontium (Sr) in terms of an oxide thereof.

12. A high thermal conductive silicon nitride sintered body according to any one of claim 8, wherein said sintered body further contains at most 1.5% by weight of at least one element selected from the group consisting of Ti, Zr, V, Nb, Ta, Cr, Mo and W in terms of the amount of an oxide thereof.

13. A high thermal conductive silicon nitride sintered body according to claim 8, wherein said sintered body has a porosity of at most 2.5% by volume, a thermal conductivity of at least 70 W/m·K, and a three-point bending strength of at least 700 MPa at a room temperature.

14. A method of producing a high thermal conductive silicon nitride sintered body, comprising the steps of: forming a compact by molding a mixture obtained by adding 2.0 to 17.5% by weight of a rare earth element in terms of the amount of an oxide thereof, 0.3 to 3.0% by weight of Hf in terms of the amount of an oxide thereof, 0.3 to 3.0% by weight of Mg in terms of the amount of an oxide thereof, to a silicon nitride powder which contains at most 1.7% by weight of oxygen, at most 0.3% by weight of Al, Li, Na, K, Fe, Ba, Mn and B as impurity cationic elements in terms of total amount thereof, and at least 90% by weight of alpha-phase type silicon nitride, and which has an average grain size of at most 1.0 μm; degreasing the compact; sintering the compact at a temperature of 1,600–1,900° C. thereby to form a sintered body; and moderately cooling the sintered body at a cooling rate of at most 100° C. per hour until the temperature is reduced to a point at which a liquid phase formed by the rare earth element during the sintering step solidifies.

15. A method of producing a high thermal conductive silicon nitride sintered body according to claim 14, wherein at most 1.5% by weight of at least one of calcium (Ca) and strontium (Sr) in terms of an oxide thereof is added to said silicon nitride powder.

16. A method of producing a high thermal conductive silicon nitride sintered body according to claim 14 or 15, wherein at most 1.5% by weight of at least one element selected from the group consisting of Ti, Zr, V, Nb, Ta, Cr, Mo and W in terms of the amount of an oxide thereof is added to said silicon nitride powder.

17. A high thermal conductive silicon nitride sintered body according to any one of claims 1, 8 and 10, wherein said sintered body after sintering has a surface roughness of 0.4 μm or less in terms of center line average roughness (Ra).

* * * * *